(12) United States Patent
Yu et al.

(10) Patent No.: US 7,804,606 B2
(45) Date of Patent: Sep. 28, 2010

(54) PORTABLE ELECTRONIC MEASURING DEVICE AND METHOD

(75) Inventors: Jing-Bo Yu, Shenzhen (CN); Liang Xie, Shenzhen (CN); Li-Yan Zheng, Shenzhen (CN); Guang-Yu Pei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/396,490

(22) Filed: Mar. 3, 2009

(65) Prior Publication Data

US 2009/0228236 A1 Sep. 10, 2009

(30) Foreign Application Priority Data

Mar. 5, 2008 (CN) .................... 2008 1 0300467

(51) Int. Cl.
*G01C 3/08* (2006.01)
*G01B 11/14* (2006.01)

(52) U.S. Cl. .................. 356/625; 356/5.01; 33/277; 33/1 G

(58) Field of Classification Search .............. 356/3, 356/5.1, 5.01, 5.11, 625, 401; 702/158; 33/277, 33/1 G, 286
See application file for complete search history.

(56) References Cited

U.S. PATENT DOCUMENTS

| | | | | |
|---|---|---|---|---|
| 5,202,742 A * | 4/1993 | Frank et al. | ................... | 356/5.1 |
| 5,455,669 A * | 10/1995 | Wetteborn | ................. | 356/5.01 |
| 5,722,179 A | 3/1998 | Zanier | | |
| 6,483,106 B1 * | 11/2002 | Ohtomo et al. | ............. | 250/236 |
| 7,086,162 B2 * | 8/2006 | Tyroler | ........................ | 33/277 |
| 7,127,821 B1 * | 10/2006 | Weisz et al. | ................... | 33/277 |
| 7,283,213 B2 * | 10/2007 | O'Connor et al. | .......... | 356/5.11 |
| 7,355,682 B2 * | 4/2008 | Bani-Hashemi | ............. | 356/3.1 |
| 7,372,771 B2 * | 5/2008 | Park | ........................... | 367/99 |
| 7,600,875 B2 * | 10/2009 | Inoue | ........................... | 353/69 |
| 2005/0128291 A1 * | 6/2005 | Murakami | ................. | 348/143 |

* cited by examiner

*Primary Examiner*—Sang Nguyen
(74) *Attorney, Agent, or Firm*—Frank R. Niranjan

(57) ABSTRACT

A method for measuring a distance D2 between two points includes following steps. A first surface of a portable electronic device is parallel to a line defined by the two points. A distance D2 between the first surface and the line is obtained. A visible light beam B1 is rotated from an initial direction substantially perpendicular with the first surface and the line to direct at the point E1. A first angle defined by the visible light beam B1 striking the point E1 and the initial direction is computed. A visible light beam B2 is rotated from an initial direction to strike the point E2. A second angle defined by the visible light beam B2 striking the point E2 and the initial direction is computed. A distance D1 is computed based on the distance D2, the first angle and the second angle. The distance D1 is outputted.

20 Claims, 4 Drawing Sheets

PORTABLE ELECTRONIC MEASURING DEVICE AND METHOD

BACKGROUND

1. Technical Field

Embodiments of the present disclosure relates to distance measure, and particularly to portable electronic measuring device and method.

2. Description of Related Art

Commonly, electronic length measuring instruments such as laser distance measuring instruments are bulky and hard to carry.

Therefore, portable electronic measuring devices and methods are needed to address the aforementioned deficiencies and inadequacies.

DETAILED DESCRIPTION OF EXEMPLARY EMBODIMENTS

Figure 1:
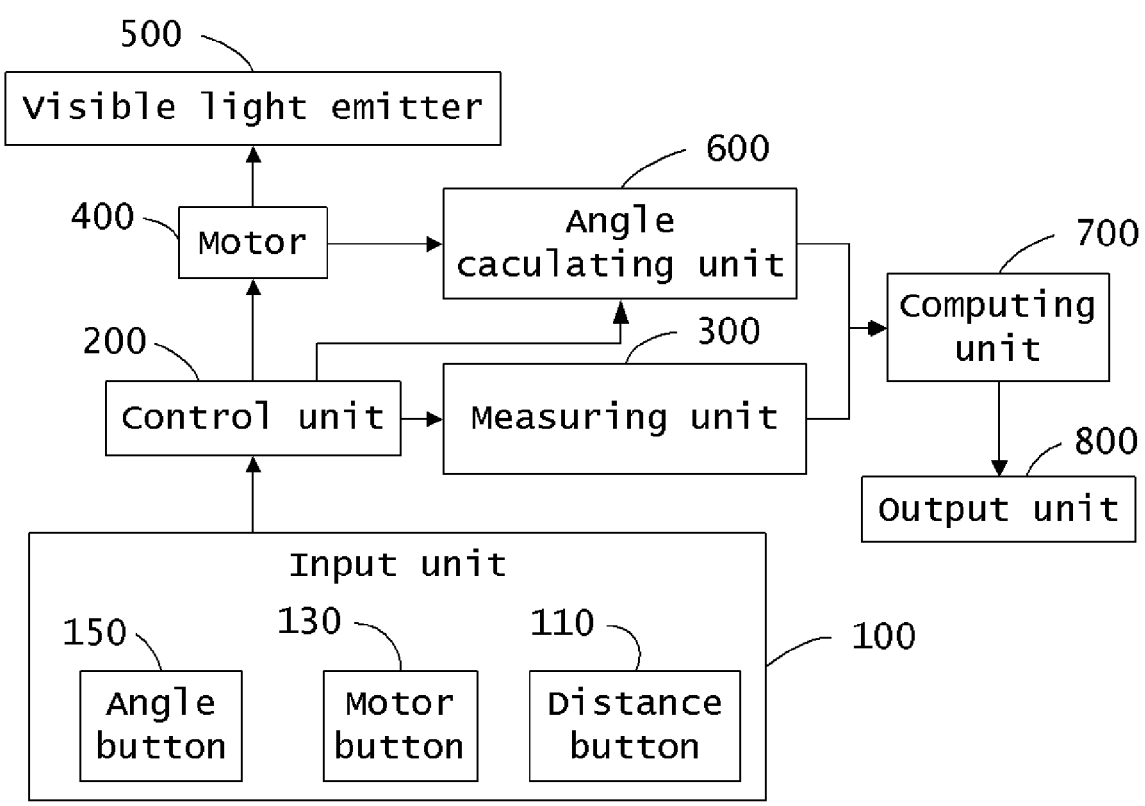
FIG. 1 is a block diagram of a portable electronic device in accordance with an exemplary embodiment.
Figure 2:
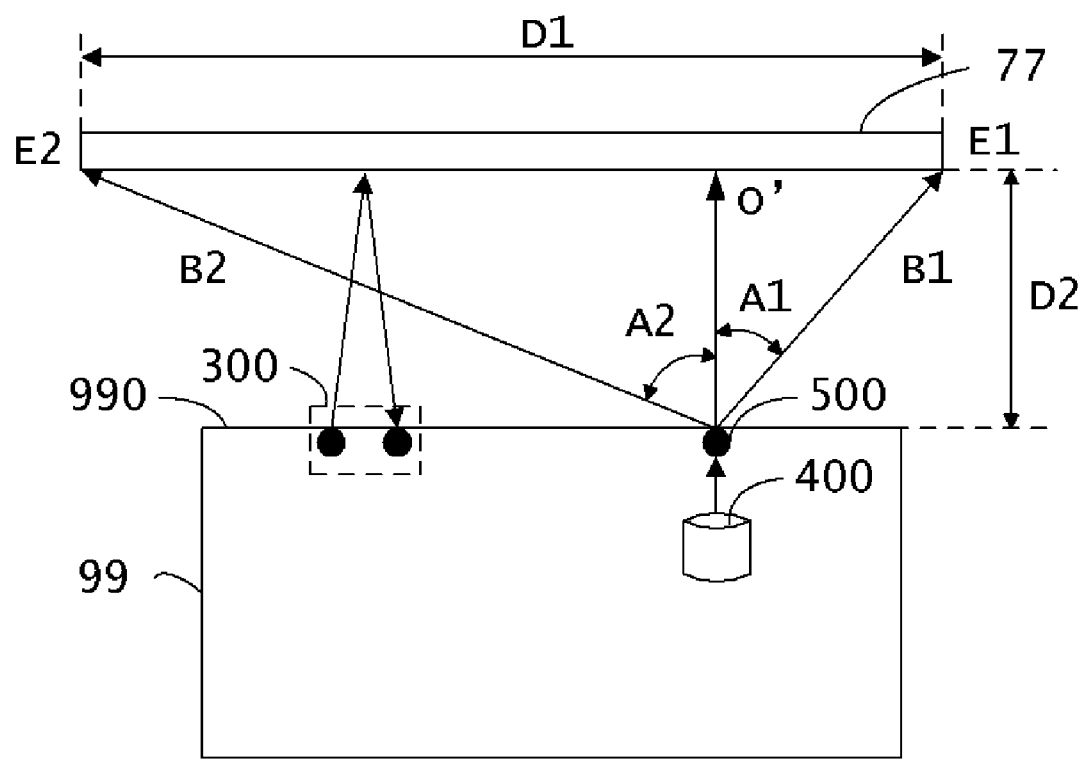
FIG. 2 is a pictorial representation of measuring principle of the portable electronic device in FIG. 1.

Referring to FIG. 1 and FIG. 2, a portable electronic device 99 is used for measuring a distance D1 between a first point E1 and a second point E2 on an object 77. The portable electronic device 99 includes an input unit 100, a control unit 200, a measuring unit 300, a motor 400, a visible light emitter 500, an angle calculating unit 600, a computing unit 700, and an output unit 800. The measuring unit 300 and the visible light emitter 500 are disposed at a first surface 990 of the portable electronic device 99.

The input unit 100 is used for receiving a request inputted by a user, generating an input signal responding to the request, and transmitting the input signal to the control unit 200. The input unit 100 includes a distance button 110, a motor button 130, and an angle button 150. A distance signal is generated when the distance button 110 is pressed. A motor signal is generated when the motor button 130 is pressed. An angle signal is generated when the angle button 150 is pressed.

The control unit 200 is used for generating control signals according to the received input signals and transmitting the control signals to the respective measuring unit 300, the motor 400 and the angle calculating unit 600.

The measuring unit 300 is used for computing a distance D2 between the first surface 990 and a line defined by the first and second points E1, E2. In one embodiment, the measuring unit 300 is a range sensor such as an ultrasonic range sensor, or a laser range sensor.

The motor 400 is used for driving the visible light emitter 500 to rotate. Therefore, a visible light beam generated by the visible light emitter 500 can be rotated from an initial direction O' to point in any of several directions, such as to the first point E1 or the second point E2. The initial direction O' is substantially perpendicular to the first surface 990 and the line defined by the first and second points E1, E2.

The angle calculating unit 600 is used for computing the angle formed by the initial direction O' and a current direction of the visible light beam. Therefore, A first angle A1 defined by a visible light beam directed at the first point E1 and the initial direction O', and a second angle A2 defined by a visible light beam directed at the second point E2 and the initial direction O' are obtained.

The computing unit 700 is connected with the measuring unit 300 and the angle calculating unit 600. The computing unit 700 is used for computing the distance D1 based on the distance D2, the first angle A1 and the second angle A2.

The output unit 800 can be a visual output or an audio output or both. Thus the Distance D1 may be displayed or a speaker could announce the distance D1 or the Distance D1 could be displayed and announced.

In operation, the first surface 990 faces to the object 77 and is approximately parallel to the line defined by the first and second points E1 and E2. The measuring unit 300 is between the first point E1 and the second point E2. The control unit 200 may received the distance signal firstly, and the control unit 200 generates a first control signal according to the distance signal and transmits the first control signal to the measuring unit 300. The measuring unit 300 computes the distance D2 between the first surface 990 and the line defined by the first and second points E1 and E2.

Then the motor signal may be received by the control unit 200, and the control unit 200 generates a second control signal according to the motor signal and transmits the control signal to the motor 400. The motor 400 drives the visible light emitter 500 to rotate right from the initial direction O' according to the second control signal. When the visible light beam generated by the visible light emitter 500 strikes the first point E1, the angle button 150 may be pressed, and the angle signal is received. The control unit 200 generates a third control signal according to the received angle signal and transmits the third control signal to the angle calculating unit 600. The angle calculating unit 600 computes a first angle A1 defined by the initial direction O' and the visible light beam striking the first point E1 according to a right rotated angle of the motor 500.

Then, the control unit 200 may generate a fourth control signal to control the motor 400 to drive the visible light emitter 500 to rotate left from the initial direction O' to the visible light beam strikes the second point E2. Likewise, a second angle A2 defined by the initial direction O' and the visible light beam striking the second point E2 is computed by the angle calculating unit 600 according to a left rotated angle of the motor 500.

Finally, the distance D1 is computed according to the distance D2, the first angle A1 and the second angle A2 by the computing unit 700. In this embodiment, the distance D1 is computed according to the following formula: $D1=D2*(\tan A1+\tan A2)$. Therefore, the distance D1 can conveniently be computed by the portable electronic device 99.

Figure 3:
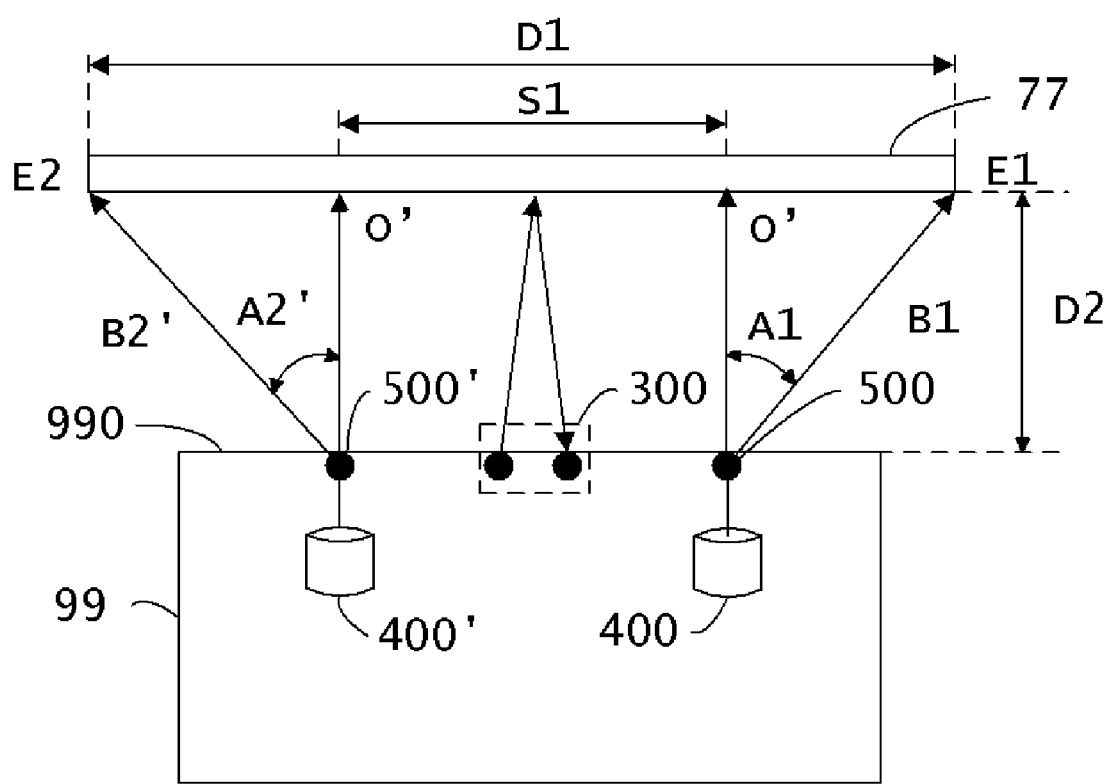
FIG. 3 is a pictorial representation of measuring principle of the portable electronic device in accordance with another embodiment.

Referring to FIG. 3, in other embodiments, the portable electronic device 99 also includes another visible light emitter 500', disposed at the first surface 990, and another motor 400' connected with the visible light emitter 500'. A distance S1 between the two visible light emitters 500, 500' is predetermined. The motor 400 rotates the visible light emitter 500 from the initial direction O' to point in another desired direction. The motor 400' rotates the visible light emitter 500' from the initial direction O' to point in another desired direction. The angle calculating unit 600 computes a first angle A1 defined by the initial direction O' and the visible light beam directed at the first point E1 according to the angle the motor 500 rotates, and a second angle A2' defined by the initial direction O' and the visible light beam directed at the second point E2 according to the angle the motor 500' rotates. The distance D1 can be computed by the computing unit 700 according to the distance D2, the first angle A1 and the second angle A2'. In this embodiment, the distance D1 is computed according to the following formula: D1=S1+D2*(tan A1+tan A2').

Figure 4:
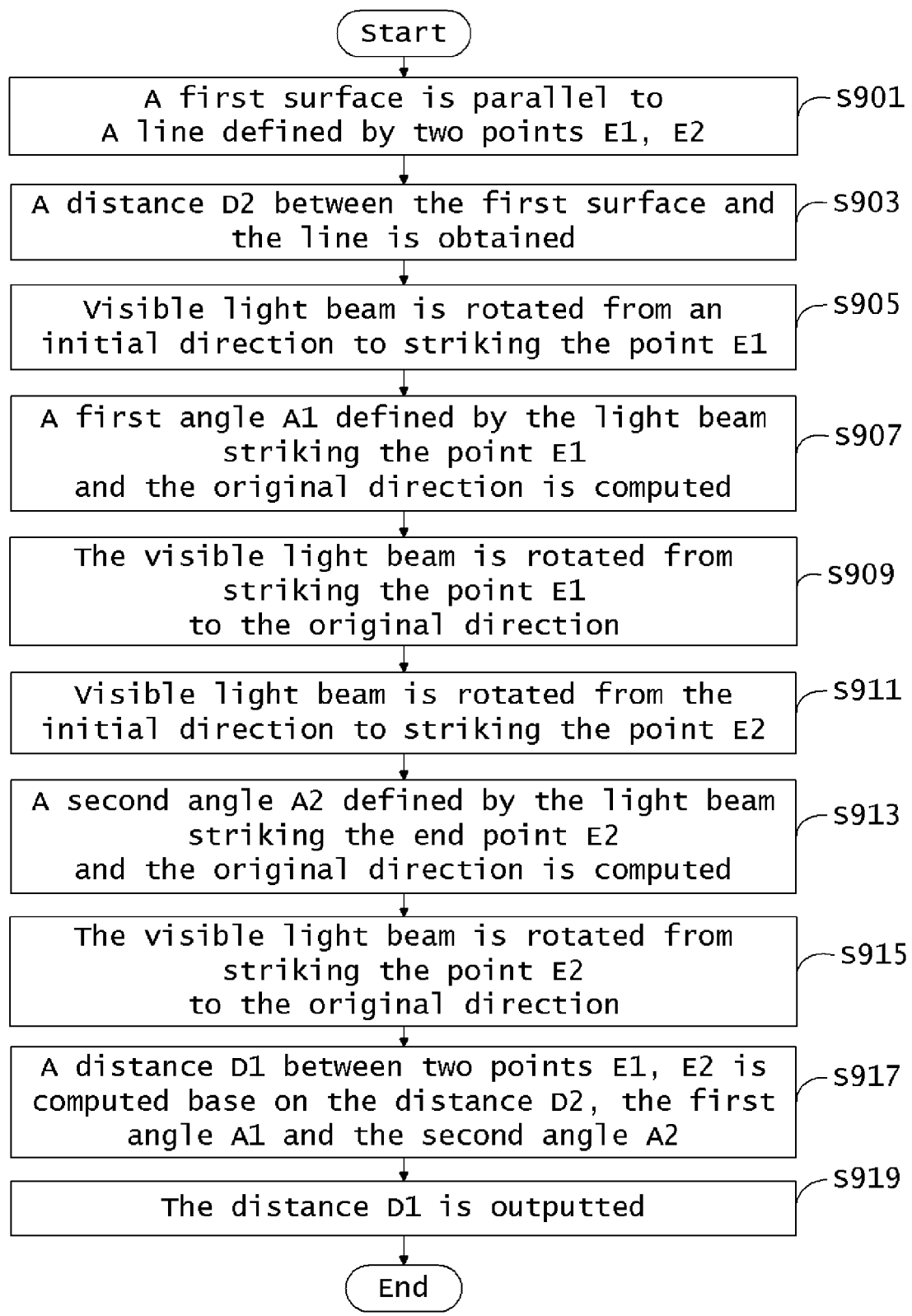
FIG. 4 is a flowchart of a portable electronic measuring method in accordance with an exemplary embodiment.

Referring to FIG. 4, a flowchart of a method for measuring a distance D1 between two points E1, E2 in accordance with an exemplary embodiment is shown. The various actions in the method may be performed in the order presented, or may be performed in a different order. Furthermore, in some embodiments, some actions shown in FIG. 4 may be omitted from the method. The method shown includes the following steps.

Beginning in step S901, a first surface of a portable electronic device is parallel to a line defined by the two points E1, E2.

In step S903, a distance D2 between the first surface and the line defined by the two points E1, E2 is obtained by a measuring unit disposed at the first surface. The measuring unit may be a range sensor such as an ultrasonic range sensor or a laser range sensor.

In step S905, a visible light beam B1, may be generated by a first visible light emitter disposed at the first surface, the visible light beam B1 is rotated from pointing in an initial direction O' to strike the point E1. The initial direction O' is substantially perpendicular with the first surface and the line joining the two points E1 and E2. The visible light emitter may be driven by a first motor to rotate the visible light beam B1.

In step S907, a first angle A1 defined by the visible light beam B1 striking the point E1 and the initial direction O' is computed. The first angle A1 may be computed according to a rotated angle of the first motor.

In step S909, the visible light beam B1 is rotated from striking the point E1 to the initial direction O'.

In step S911, a visible light beam B2 is rotated from pointing in an initial direction O' to strike the point E2. The visible light beam B2 may be generated by the first visible light emitter. In other embodiment, the visible light beam B2' may be generated by a second visible light emitter disposed at the first surface. The second visible light emitter, may be driven by a second motor to rotate the visible light beam B2'. A distance S1 between the first and second visible light emitters is predetermined.

In step S913, a second angle A2 defined by the visible light beam B2 striking the point E2 and the initial direction O' is computed. The second angle A2 is computed according to a rotated angle of the first motor. In the other embodiment, the second angle A2' is computed according to a rotated angle of the second motor.

In step S915, The visible light beam B2 is rotated from directing at the point E2 to point in the initial direction O'

In step S917, the distance D1 between the two point E1 and E2, is computed base on the distance D2, the first angle A1 and the second angle A2. In this embodiment, the distance D1 is computed according to the following formula: D1=D2*(tan A1+tan A2). In the other embodiment, the distance D1 is computed according to the following formula: D1=S1+D2*(tan A1+tan A2').

In step S919, the distance D1 is outputted via at least one medium of visual images or audible sounds.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A portable electronic device for measuring a distance (D1) between two points (E1, E2), the portable electronic device comprising:
    a first surface facing and parallel to a line defined by the two points (E1, E2);
    a measuring unit disposed at the first surface for measuring a distance (D2) between the first surface and the line;
    a visible light emitter disposed at the first surface for generating a visible light beam and an initial direction of the visible light beam is substantially perpendicular to the first surface and the line defined by the two points (E1, E2);
    a motor connecting with the visible light emitter for rotating the visible light emitter from the initial direction to pointing in another desired direction;
    an angle calculating unit for computing a first angle defined by the visible light beam striking the point (E1) and the initial direction, and a second angle defined by the visible light beam striking the point (E2) and the initial direction according to a rotated angle of the motor;
    a computing unit for computing the distance (D1) between the two points (E1, E2) base on the distance (D2) and the first and second angles; and
    an output unit for outputting the distance (D1).

2. The portable electronic device according to claim 1, wherein the portable electronic device further comprising
    an input unit for receiving a request, generating an input signal according to the request, and transmitting the input signal to a control unit, and
    the control unit connected with the input unit, the measuring unit, the motor and the angle calculating unit, the control unit for generating control signals according to the received input signals and transmitting the control signals to the respective measuring unit, the motor and the angle calculating unit.

3. The portable electronic device according to claim 2, wherein the input unit comprises a distance button, a motor button, and an angle button, a distance signal is generated when the distance button is pressed, the control unit generates a first control signal according to the received distance signal and transmits the first control signal to the measuring unit; a motor signal is generated when the motor button is pressed, the control unit generates a second control signal according to the received motor signal and transmits the second control signal to the motor; an angle signal is generated when the angle button is pressed, the control unit generates a third control signal according to the angle distance signal and transmits the third control signal to the angle calculating unit.

4. The portable electronic device according to claim 1, wherein the measuring unit is a range sensor.

5. The portable electronic device according to claim 1, wherein the output unit outputs the distance (D1) via visual images or audible sounds.

6. The portable electronic device according to claim 1, further comprising another visible light emitter disposed at the first surface for generating another visible light beam and an initial direction of the another visible light beam is substantially perpendicular to the first surface and the line defined by the two points (E1, E2), a distance (S1) between the two visible light emitters is predetermined.

7. A portable electronic device for measuring a distance (D1) between two points, the portable electronic device comprising:
- a measuring unit configured for measuring a perpendicular distance (D2) between the portable electronic device and a line defined by the two points;
- at least one visible and rotatable light emitter for generating a rotatable light beam, and a line joining the measuring unit and the light emitter is parallel to the line defined by the two points;
- an angle calculating unit for computing two angles defined by the rotatable light beams targeting at the two points respectively;
- a computing unit for computing the distance (D1) between the two points according to the perpendicular distance (D2) and the two angles; and
- an output unit for outputting the distance (D1).

8. The portable electronic device according to claim 7, wherein the at least one light emitter is disposed at a first surface of the portable electronic device, and the first surface is capable of being parallel to the line.

9. The portable electronic device according to claim 7, wherein the at least one light emitter is one light emitter, the portable electronic device further comprises a motor connected to the light emitter for rotating the light emitter.

10. The portable electronic device according to claim 7, wherein the at least one light emitter is two light emitters, the portable electronic device further comprises two motors connected to the respective light emitter for rotating the respective light emitter to rotate, a distance (S1) between the two light emitters is predetermined.

11. The portable electronic device according to claim 7, wherein the portable electronic device further comprising:
- an input unit for receiving a request, generating an input signal according to the request, and transmitting the input signal to a control unit, and
- the control unit connected with the input unit, the measuring unit, the first motor, the second motor and the angle calculating unit, the control unit for generating control signals according to the received input signals and transmitting the control signals to the respective measuring unit, the first motor, the second motor and the angle calculating unit.

12. The portable electronic device according to claim 7, wherein the output unit outputs the distance (D1) via visual images or audible sounds.

13. The portable electronic device according to claim 7, wherein the measuring unit is a range sensor.

14. The portable electronic device according to claim 7, wherein an initial direction of the visible light beam is substantially perpendicular to the line defined by the two points, one of the two angles being defined by the initial direction and the light beam targeting at one of the two point, the other one of the two angles being defined by the initial direction and the light beam targeting at the other one of the two point.

15. A method for measuring a distance (D1) between two points (E1, E2) comprising:
- a first surface of a portable electronic device is disposed to be parallel to a line defined by the two points (E1, E2);
- a distance (D2) between the first surface and the line is obtained;
- a visible light beam B1 is rotated from an initial direction (O') substantially perpendicular with the first surface and the line to impinge on the point (E1);
- a first angle A1 defined by the visible light beam (B1) striking the point (E1) and the initial direction (O') is computed;
- a visible light beam (B2) is rotated from pointing in an initial direction (O') to impinge on the point (E2);
- a second angle (A2 defined by the visible light beam (B2) striking the point (E2) and the initial direction (O') is computed;
- the distance (D1) between the two points is computed based on the distance (D2), the first angle A1 and the second angle (A2); and
- the distance (D1) is outputted to an output unit.

16. The method according to claim 15, wherein the output unit is a display or a speaker, the distance (D1) is outputted by the output unit via visual images or audible sounds.

17. The method according to claim 15, wherein the method further comprising:
- the visible light beam (B1) is rotated from striking the point (E1) to the initial direction (O').

18. The method according to claim 17, wherein the visible light beams (B1) and (B2) are generated by the same visible light emitter.

19. The method according to claim 15, wherein the visible light beams (B1) and (B2) are respectively generated by two distinct visible light emitters and a distance (S1) between the two visible light emitters is predetermined.

20. The method according to claim 15, wherein the method further comprising:
- the visible light beam (B2) is rotated from directing at the point (E2) to the initial direction (O').

* * * * *